United States Patent [19]

Dartey et al.

[11] Patent Number: 4,678,672

[45] Date of Patent: Jul. 7, 1987

[54] REDUCED CALORIE CRACKERS AND PROCESSES FOR PRODUCING SAME

[75] Inventors: Clemence K. Dartey, Oakland; Richard H. Biggs, Paterson, both of N.J.

[73] Assignee: Nabisco Brands, Inc., Parsippany, N.J.

[21] Appl. No.: 736,355

[22] Filed: May 21, 1985

Related U.S. Application Data

[63] Continuation-in-part of Ser. No. 589,588, Mar. 14, 1984.

[51] Int. Cl.[4] .................... A21D 2/00; A21D 8/02; A21D 10/00
[52] U.S. Cl. ...................................... 426/19; 426/62; 426/554; 426/548; 426/804
[58] Field of Search ................... 426/549, 551–555, 426/653, 658, 548, 804, 19, 62

[56] References Cited

U.S. PATENT DOCUMENTS

| | | | |
|---|---|---|---|
| T100,503 | 4/1981 | Taylor et al. | 426/549 |
| 3,676,150 | 7/1972 | Glickaman et al. | 99/90 R |
| 3,766,165 | 10/1973 | Rennhard et al. | 260/209 R |
| 3,876,794 | 4/1975 | Rennhard | 426/548 |
| 4,042,714 | 8/1977 | Torres | 426/62 |
| 4,219,580 | 8/1980 | Torres | 426/549 |
| 4,304,768 | 12/1981 | Staub et al. | 424/180 |
| 4,351,852 | 9/1982 | Rule et al. | 426/554 |
| 4,371,561 | 2/1983 | Forsythe | 426/653 |
| 4,511,318 | 4/1985 | Kolodesh | 426/94 |

FOREIGN PATENT DOCUMENTS

| | | |
|---|---|---|
| 1016006 | 3/1977 | Canada . |
| 0086527 | 8/1983 | European Pat. Off. . |
| 1418544 | 12/1975 | United Kingdom . |

OTHER PUBLICATIONS

Bohn, Biscut and Crocker Production, American Trade Pub. Co., N.Y. 1957, pp. 92–98, 104,106–112.

Matz, Cookie and Cracker Technology, The Avi Pub. Co. Inc., Westport, Conn., 1968, pp. 137–142.

H. M. Reiman, *Chemical Leaving Systems,* Bakers Digest, Jul./Aug., 1983, pp. 37–40.

K. D. Brys, *Micrecrystalline Cellulose Replacement in Cakes and Biscuits,* Journal of the American Dietetic Association, 50–55.

P. E. Hutchinson, *Effect of Emulsifiers on the Texture of Cookies,* Journal of Food Science, vol. 42, No. 2 (1977).

C. C. Tsen, The Shortening-Sparing Effect of Sodium Stearoly-2 Lactylate and Calcium Stearoyl-2 Lactylate in Bread Baking, Reprinted from the Jun. 1971 issue of Bakers Digest, vol. 45, No. 3, pp. 38–40, 42.

J. J. Beereboom, *Low Calorie Bulking Agents,* CRC Critical Reviews in Food Science and Nutrition, May 1979.

W. C. Griffin, *Emulsions,* Enclylopedia of Chemical Technology, vol. 8, 2nd Ed., John Wiley & Sons, Inc., pp. 900–930 (1965).

*Primary Examiner*—Raymond N. Jones
*Assistant Examiner*—Marianne M. Cintins
*Attorney, Agent, or Firm*—Richard Kornutik

[57] ABSTRACT

Reduced calorie crackers produced from dough compositions are disclosed which contain 25–70 percent of flour, 0–20 percent of gluten, 0–10 percent fat or shortening, 5–20 percent of a water-soluble polydextrose, 0–5 percent of one or more emulsifiers, 0.5–5 percent of a leavening system comprising yeast and a carbon dioxide-releasing material, and 1.5–10 percent of a cellulosic bulking agent, all percentage being by weight based upon the total weight of the dough, and the total amount of fat, shortening and emulsifier being 3–10 percent weight of the dough. The crackers may be produced either by a one-stage process in which all the ingredients are mixed together prior to fermentation, or by a two-stage process using a sponge stage followed by a dough-up stage. The crackers are desirably produced, in the one-stage process, using a single, rather than a multiple, lamination technique.

78 Claims, No Drawings

REDUCED CALORIE CRACKERS AND PROCESSES FOR PRODUCING SAME

This application is a continuation-in-part of our co-pending application Ser. No. 06/589,588 filed Mar. 14, 1984. The entire disclosure of this earlier application is herein incorporated by reference.

FIELD OF THE INVENTION

This invention relates to dough compositions for producing reduced calorie crackers. This invention also relates to reduced calorie crackers and to processes for their preparation.

BACKGROUND OF THE INVENTION

The ready availability of a variety of highly flavorful food products coupled with the relatively sedentary lifestyles of a large segment of the population has given rise to excess accumulation of calories in most citizens. Estimates indicate that about 40% of the U.S. population may be overweight. J. J. Beereboom, *CRC Critical Reviews in Food Science and Nutrition*, pps. 401–413, May 1979. Consequently, an increasing number of consumers are practicing some form of dieting and monitoring of caloric intake. This is evidenced by the rapid growth and successful introductions of a variety of reduced calorie products, such as cake mixes, beers, wines, pizzas, candies, sodas, margarines and cookies, etc., into the food market.

Flour, fats or shortening and, in some cases, emulsifiers contribute a majority of the calories to conventional crackers. It is known that portions of these components can be replaced with lower calorie components which perform at least some of the same functions. However, even when a functional equivalent is found, it often adversely affects other physical or chemical properties of the dough and/or baked crackers.

Emulsifiers, fats and shortenings are functionally active in baked goods, including crackers. As well known, the primary functions of these products include structural support, tenderization, freshness preservation, lubrication and aeration of doughs, control of fat crystal growth or development and modification of dough consistency through reaction with wheat proteins (gluten).

Emulsifiers are surfactants or surface-active agents. Apart from their interface action as stabilizing agents for emulsions, foams and suspensions, they also play an important role as texture modifiers through their interaction with polymers, such as starch and protein and by their modification of lipid crystallization.

A shortening is a plastic fat, and by definition, is a mixture of triglycerides having widely differing melting points. Fat crystals in a shortening are held together by internal cohesive forces and liquid oil is enmeshed in the structure. The performance of a fat or shortening in a baked product depends on its physical properties. These properties include ratio of solids to liquids (solid fat index) over a wide range of temperatures, size and shape of the crystals, and the nature of polymorphism in the fat crystals.

The two most common types of emulsion systems encountered in foods are oil-in-water and water-in-oil emulsions. An emulsion is a macro-disperse system, a two-phase system of two incompletely miscible liquids, one being dispersed as finite globules in the other. The dispersed, discontinuous, or internal phase is the liquid that is broken up into globules. The surrounding liquid is the continuous or external phase. In an oil-in-water (O/W) emulsion system, water forms the continuous phase. Similarly in a water-in-oil (W/O) emulsion system, the oil forms the external or continuous phase.

The Hydrophile-Lipophile-Balance (hereinafter referred to as HLB) system is the systematic approach used in selection of emulsifiers. See *Emulsions*, W. C. Griffin, Encyclopedia of Chemical Technology, Vol. 8, 2nd Edition, John Wiley and Sons Inc., pps. 117–154, (1965) and W. C. Griffin, J. Soc. Cosmet. Chem., 1: 311, 1949. This is based on the recognition that each emulsifier is amphiphilic in nature, that is, each emulsifier possesses both hydrophilic and lipophilic groups in the same molecule.

Emulsifiers have been assigned HLB values from 0–20. These emulsifiers with HLB values less than 9 are lipophilic while those with HLB values above 11 are hydrophilic. Emulsifiers with HLB values of 9–11 have substantially equal affinities for water and oil. A multi-component emulsifier system with the same HLB value as a single emulsifier is known to give greater emulsion stability than an emulsion system composed of only a single emulsifier. O. K. Chung and Y. Pomeranz, *ISF/AOCS World Congress*, NY, April 1980.

The weight percentages of shortenings and emulsifiers used in most crackers are low. However, shortenings and most emulsifiers have high caloric values. Consequently, only limited amounts of shortenings and/or emulsifiers can be used in the formulations for reduced or low calorie crackers. The amounts of flour in these types of products must also be reduced through the use of suitable, reduced calorie bulking agents.

Shortening-sparing effects of sodium stearoyl-2-lactylate (SSL) and calcium stearoyl-2-lactylate (CSL) have been studied in regular white bread and high protein bread. See Tsen et al, *Baker's Digest* Vol. 45 No. 3, pp. 38–40, and 42 (1971). Sodium stearoyl-2-lactylate or SSL, added to a sponge at 0.25 percent to 0.5 percent, effectively replaced the normal 3.0 percent textured lard required in white bread or high protein (12 percent soy flour) bread. Sodium stearoyl-2-lactylate, 0.5 percent, reportedly, produced an acceptable high protein bread superior in loaf volume and score to the control high protein bread with 3 percent shortening.

Hutchinson et al., *J. Food Sci.* Vol. 42 No. 2, p. 399 (1977), also studied and determined the shortening-sparing effects in cookies of various levels of emulsifiers including SSL, lactylic acid esters of fatty acids (LA-EFA), ethoxylated monoglycerides (EMG) and diglycerides (EDG), polyglycerol esters (PGE) and diacetyl tartaric acid esters (DATA). They found that in order to maintain proper balance in the formulas of reduced shortening cookies, it was necessary to increase the water in the recipes by one-half the weight of shortening removed.

In U.S. Pat. No. 4,351,852 the caloric content of cake batters or mixes is reduced by replacement of the normal fat content with a partial glycerol ester emulsifier, the major constituent of which is diglyceride, present in an amount of about 38 to 48 percent. The partial glyceride ester emulsifier is used in an effective amount so as to obtain improved cake volume, grain and texture. The preferred amount of emulsifiers is about 10 to 25 percent, based on the weight of the flour employed. A conventional cake formulation as disclosed may employ about 40 to 60 percent by weight of a fluid shortening, based upon the weight of the flour. Additional lipids or fat, or other emulsifiers, it is taught, can be used in combination with the partial glyceride ester emulsifier to obtain various properties. However, use of this emulsifier with a flour substitute to achieve further calorie reductions is not disclosed.

Improved emulsifiers for use in the preparation of baked goods are disclosed in U.S. Pat. No. 4,371,561 and in U.S. Pat. No. T100,503. According to U.S. Pat. No. 4,371,561, the thermal mixing of hydrogenated stearin with stearoyl lactylate salts advantageously increases the melting and softening points and reduces the hygroscopicity of such salts. In the Defensive Publication, liquid emulsifiers for bread are prepared by blending diacetal tartaric acid esters of unsaturated vegetable oil or animal fats, monoglycerides, unsaturated vegetable oil and propylene glycol monoester of unsaturated vegetable oil or animal fat. The use of these liquid emulsifiers in the preparation of bread, it is disclosed, imparts excellent physical characteristics to the bread. However, neither of these references disclose the use of these emulsifiers to obtain caloric reduction in baked goods.

In addition to fats, the other principal source of calories in most crackers is flour. The protein content of most crackers is low. Consequently, any considerations for reduction in calories of these products must involve reductions in metabolizable carbohydrates (by reduction of flour content, since crackers do not normally contain substantial amounts of sugars) and/or fats and oils.

When the level of flour is reduced to achieve reduction in the calorie content of crackers, suitable bulking agents or non-metabolizable forms of carbohydrates must be used to balance the formulae of the crackers. Such a bulking agent must be an insoluble material capable of replacing the lost flour or starch in the formulations. The rheological properties of the flour and starch must be adjusted to successfully replace the flour and starch. A number of commercially available products, natural and synthetic, have been used as bulking agents for fats and carbohydrates in various reduced calorie baked products as disclosed in Beereboom, *CRC Critical Reviews in Food Science and Nutrition*, pps. 401-413 (May 1979), Brys, *J. Amer. Dietetic Assoc.*, Vol. 69 No. 6, pp. 50-55 (1976) and U.S. Pat. No. 3,876,794. These products include cellulose, microcrystalline cellulose, xanthan gum, polydextrose, polyglycerol esters, polyoxyethylene fatty acid esters and sucrose polyester.

However, as reported by Beereboom, supra, foods which contain appreciable quantities of cellulose exhibit poor palatability. Accordingly, the use of cellulose products in foods has been at relatively low levels for texture improvement.

In U.S. Pat. No. 4,219,580 it is taught that the cellulosic flour substitutes, such as crystalline alpha-cellulose sold under the tradename "Solka-Floc", and the microcrystalline cellulose sold under the tradename "Avicel", can only be used up to a replacement level of about 20 percent which leads to a caloric reduction in the final baked goods of only about 10 percent. The taste and texture of baked goods obtained using replacement levels greater than about 20 percent, it is disclosed, are unsatisfactory.

It has been found that generally gums and/or gels perform poorly, even at low levels of less than 0.5 percent by weight. Typically, cookies which contain gums and/or gels are gummy and do not spread during baking. Humectant gels, however, have been found to improve spreading and textural characteristics of cookies at levels up to about 10 percent. In U.S. Pat. No. 3,676,150, low calorie, yeast leavened baked goods, including bread, are prepared from a flour which is a combination of starch, cellulose gums, and alpha-cellulose. According to U.S. Pat. No. 3,676,150, the starch and cellulose gums apparently react with the surface moisture of the alpha-cellulose and with the alpha-cellulose per se to form a flour which has the same film-forming characteristics as that of gluten-containing wheat flour. However, the gluten-free flour of U.S. Pat. No. 3,676,150 contains, on a weight basis, from about 30 to about 70 percent alpha-cellulose. Use of this flour in the production of baked goods in substantial amounts would detract from palatability of the product due to the large amounts of alpha-cellulose.

In European Patent Publication No. 0086527A, published Aug. 24, 1983, it is taught that when a liquid polyol polyester is used to replace a substantial part of the triglycerides in a baked goods composition, up to 100 percent of the flour or starch in the composition may be replaced with microcrystalline cellulose without causing the expected undesirable side effects of cellulose in food products such as poor texture, and dry, sandy or gritty mouthfeel. The baked products comprise from about 12 to about 60 percent of a non-absorbable, non-digestible liquid polyol fatty acid polyester, from about 10 to about 50 percent by weight of the polyester of an anti-anal leakage agent, and from about 25 to about 85 percent of either microcrystalline cellulose and flour in a weight ratio of at least 1:1. The anti-anal leakage agent, it is taught, prevents frank leakage of the liquid polyesters through the anal sphincter.

According to U.S. Pat. No. 4,304,768 dietary fiber preparations are incorporated into polysaccharide and/or polyol-containing foodstuffs at a level sufficient to exhibit an anti-diarrheal effect. The polysaccharide materials may be of the soluble or insoluble type taught in U.S. Pat. No. 3,766,165. Alpha-cellulose is disclosed as a dietary fiber preparation which exhibits an anti-diarrheal effect.

Dietary fibers, such as wheat and corn brans, and soy filtrate, a soybean by-product, have relatively low calorie content of 2.13 calories/gram, 0.1 calorie/gram, and 1.0 calorie/gram, respectively. However, as reported by Beereboom, supra, dietary fibers frequently cause significant textural problems in baked goods. Use of significant amounts of such dietary fibers in crackers leads to objectionable changes in the desired crisp texture of the crackers. Only modest caloric reductions in the crackers are possible while some palatability problems remain.

Polydextrose, as reported in Beereboom, supra, can provide the bulk and texture normally attained from sucrose. It is reported that polydextrose can also function as a partial replacement for fat, flour, or starch in some applications. Its use in foods to reduce calorific values is desirable because its calorific value is only one calorie per gram.

In U.S. Pat. Nos. 3,766,165 and 3,876,794, United Kingdom Pat. No. 1,418,544, and Canadian Pat. No. 1,016,006 each to Rennhard, the production of polyglucoses or polydextroses, and polymaltoses is disclosed. The polymers are produced directly from glucose and maltose by a process of anhydrous melt polymerization using edible acids as catalysts and as cross-linking agents. By controlling the amount of acid, either a water soluble or water insoluble polymer or both forms can be produced. As the amount of acid is increased, the degree of acid cross-linking increases and the proportion of water-insoluble polyglucose or polymaltose increases.

The soluble polyglucoses and polymaltoses, it is disclosed, are useful for imparting the physical properties of natural foods, other than sweetness, to dietetic foods of which the natural sugars have been removed and have been replaced by artificial or other sweeteners. The soluble forms of polyglucose and polymaltose are not sweet. According to Rennhard, the soluble polyglucoses or polymaltoses affect rheology and texture of baked goods in a manner analogous to sugar and can replace it as a bulking agent; however, sugar is of course normally not present as a bulking agent in crackers. In U.S. Pat. No. 3,876,794, Rennhard also teaches that the polyglucoses allow the elimination of 20 to 100 percent of the normal fat, oil or fatty triglycerides components of the food, depending upon the type of food. The insoluble polyglucoses, it is taught, are useful as flour substitutes in cakes, cookies, breads, pastries, and other baked products involving flour derived from wheat, corn, rice and the like.

According to U.S. Pat. No. 3,876,794, United Kingdom Pat. No. 1,418,544 and Canadian Pat. No. 1,016,006, in leavened baked foods such as cakes, cookies, and cupcakes, each part by weight of the fatty triglyceride and carbohydrate normally present in the product is replaced by from about 0.25 to 1.5 parts by weight of modified polyglucose. The modified polyglucoses include citrated and tartrated polyglucose in neutralized or acid forms, the preferred forms being citrated polyglucose with sorbitol, in neutral and acid form. The latter forms contain about 5 to about 20 percent by weight of sorbitol chemically bonded to the polyglucose.

Production of a dietetic cookie is disclosed in Example XLVI of U.S. Pat. No. 3,876,794 and in Example XV of United Kingdom Pat. No. 1,418,544 and Canadian Pat. No. 1,016,006. The modified polyglucose powder, non-fat milk solids and emulsified shortening are creamed, eggs are added, and mixing is continued. Water, containing dissolved saccharine and flavor are then added to the mixture. Flour, sodium bicarbonate, glucono-delta lactone and micro-crystalline cellulose are then added and mixing is continued, followed by baking at 375° F. for 15 to 20 minutes. The modified polydextrose is about 26 percent by weight, the flour is about 24 percent by weight, the shortening is about 17 percent by weight, and the microcrystalline cellulose is about 8 percent by weight of the cookie dough. However, saccharine but no sugar is used in the cookie dough formulation which results in a final product of inferior taste and texture. Additionally, incorporation of the modified polydextrose powder in the creaming stage results in lump development and a sticky dough which requires an undesirably long laytime for commercial scale wire cut production methods.

U.S. Pat. No. 4,042,714 discloses a low-calorie faricanceous composition comprising from about 20 to 75 percent by weight of modified polydextrose, from about 2 to 20 percent by weight of proteinaceous material, from about 10 to 40 percent by weight of cellulose derivatives selected from alpha-cellulose and microcrystalline cellulose, and from about 5 to 20 percent by weight of flour. The polydextrose is a water-soluble highly branched polydextrose containing from about 0.5 to 5 mole percent of polycarboxylic acid ester group selected from the group consisting of citric, fumaric, tartaric, succinic, adipic, idiconic and malic acids. The polydextrose also contains from about 5 to 20 percent by weight of a food-acceptable polyol. According to U.S. Pat. No. 4,042,714, the water soluble forms of modified polydextrose disclosed in U.S. Pat. No. 3,876,794 and in U.S. Pat. No. 3,766,165, function as a replacement for sucrose in many foods. However because of their solubility, they cannot function as flour replacements. The composition of U.S. Pat. No. 4,042,714, it is taught, can serve as a replacement for at least 50 percent of the wheat flour used in food compositions such as pastas, pancakes, and leavened baked foods.

The flour substitutes of U.S. Pat. No. 4,219,580 comprise either cellulose or a non-digestible, acid treated starch derivative or a mixture thereof together with a minor amount of xanthan gum and a minor amount of an emulsifier agent. The preferred emulsifiers are lecithin, mono-diglyceride mixture, sodium stearoyl-2-lactylate and triglycerolmonostearate. The flour substitute of U.S. Pat. No. 4,219,580 is used at levels as high as 70 percent replacement of the flour component so as to achieve a maximum of about 30 to 35 percent fewer calories per unit weight than conventional baked goods.

The flour substitute, it is disclosed, can be used in the preparation of baked goods in which some or all of the sugar component has been replaced by a lower calorie substitute, such as the modified polydextroses described in U.S. Pat. No. 3,766,165. In the chocolate flavored cookie formulation of Example X and in the vanilla flavored cookie formulation of Example XIV of U.S. Pat. No. 4,219,580, 100 percent and 25 percent of the sugar, respectively is replaced by modified polydextrose.

The present invention provides a process for the preparation of reduced calorie crackers which possess the desirable texture, mouthfeel, and appearance of conventional crackers by partially replacing the flour and shortening or fat with emulsifiers, polydextroses and cellulosic bulking agents. The crackers are intended to have texture, appearance, flavor and mouthfeel which appeal to the general consumer and not just dedicated dieters or persons whose dietary intakes are restricted medically for reasons such as diabetes and excessive obeseness. Caloric reductions of at least 25 percent, based upon conventional formulations, are achieved.

SUMARY OF THE INVENTION

The present invention relates to dough compositions and processes for producing reduced calorie crackers which possess the desirable texture, mouthfeel and appearance of conventional crackers. Reductions in the flour and shortening contents of the crackers are compensated with lower calorie ingredients, which may include a water-soluble polydextrose, an emulsifier and a cellulosic bulking agent.

Accordingly, this invention provides a dough composition for producing reduced calorie crackers, the composition comprising:
(a) from about 25 to about 85 percent by weight of flour;
(b) from 0 to about 10 percent by weight fat or shortening;
(c) from about 5 to about 20 percent by weight of a water-soluble polydextrose;
(d) from 0 to about 5 percent by weight of at least one emulsifier;

(e) from about 0.5 to about 5 percent by weight of a leavening system, the leavening system comprising yeast and a material capable of releasing carbon dioxide during baking; and (f) from about 1.5 to about 10 percent by weight of a cellulosic bulking agent, all percentages being based upon the total weight of the dough, the total amount of the fat, shortening and emulsifier being from about 3 to about 10 percent by weight of the dough.

This invention also provides a process (hereinafter referred to as the one-stage process of the invention) for producing a cracker, this process comprising mixing:

(a) from about 25 to about 85 percent by weight of flour;

(b) from 0 to about 10 percent by weight fat or shortening;

(c) from about 5 to about 20 percent by weight of a water-soluble polydextrose;

(d) from 0 to about 5 percent by weight of at least one emulsifier;

(e) from about 0.5 to about 5 percent by weight of a leavening system, the leavening system comprising yeast and a material capable of releasing carbon dioxide during baking; and (f) from about 1.5 to about 10 percent by weight of a cellulosic bulking agent to form a dough, all percentages being based upon the total weight of this dough, the total amount of fat, shortening and emulsifier in the dough being from about 3 to about 10 percent by weight of the dough;

allowing the dough to ferment for at least about 2 hours; and baking the fermented dough to produce a cracker.

This invention also provides a second process (hereinafter referred to as the two-stage process of the invention) for producing a cracker, this process comprising:

(A) mixing from about 20 to about 65 parts by weight of flour, from about 5 to about 20 parts by weight of a water-soluble polydextrose, and yeast to form a sponge;

(B) fermenting the sponge for a period of at least about 4 hours;

(C) mixing with the fermented sponge additional quantities of flour, a material capable of releasing carbon dioxide during baking and any other ingredients required to form a dough having the following composition:

(a) from about 25 to about 85 percent by weight of flour;

(b) from 0 to about 10 percent by weight fat or shortening;

(c) from about 5 to about 20 percent by weight of a water-soluble polydextrose;

(d) from 0 to about 5 percent by weight of at elast one emulsifier;

(e) from about 0.5 to about 5 percent by weight of a leavening system, the leaving system comprising yeast and a material capable of releasing carbon dioxide during baking; and (f) from about 1.5 to about 10 percent by weight of a cellulosic bulking agent, all percentages being based upon the total weight of the dough, the total amount of the fat, shortening and emulsifier being from about 3 to about 10 percent by weight of the dough; and (D) baking the dough to form a cracker.

DETAILED DESCRIPTION OF THE INVENTION

Reduced calorie crackers with a calorie reduction of at least 25 percent, more preferably a calorie reduction of at least one-third are achieved by lowering the flour and shortening contents of the baked goods. Reductions in these components are compensated with low calorie ingredients which include a water-soluble polydextrose and a cellulosic bulking agent.

As used herein, the term "reduced calorie crackers" refers to a calorie reduction of at least 25 percent compared to a conventional formulation of the same type. Generally, reduced calorie crackers produced by the processes of the present invention have a calorie content of about 2.9 to 3.3 calories per gram, whereas a prior art cracker typically has a calorie content of about 4.4 calories per gram.

In the present invention a water-soluble polydextrose is used primarily as a replacement for fats or shortening. Water-soluble polydextroses which can be used in the present invention are disclosed in U.S. Pat. Nos. 3,766,165 and 3,876,794. As disclosed in these patents, the water-soluble polydextroses are highly branched and the 1-6 linkage predominates. Additionally, they have a number average molecular weight between about 1,500 and 18,000 and contain from about 0.5 to 5 mole percent of polycarboxylic acid ester groups wherein the acid is selected from the group consisting of citric, fumaric, tartaric, succinic, adipic, itaconic and terephthalic acids.

Polydextrose for use in producing the reduced calorie crackers of the present invention is commercially available. A preferred commercial form for use in the present invention is polydextrose-N which is manufactured by Pfizer, Inc. Polydextrose-N is a neutralized light-colored 70 percent aqueous solution. The calorific value of polydextrose-N is about 0.7 calories per gram of solution or about 1 calorie per gram, dry basis. It has an average molecular weight of 1500, ranging from 162 to approximately 20,000. Typical specifications for polydextrose-N are, by weight, greater than 90 percent polymer, less than 4 percent glucose, less than 2 percent sorbitol, less than 4 percent levoglucosan, less than 0.5 percent citric acid, less than 0.1 percent 5-hydroxymethylfurfural, from 27.5 to 32.5 percent water, and less than 2 percent sulfated ash. Polydextrose-N has a viscosity of $1200\pm400$ cps at 25° C. Additionally, it has a pH of about 5.0 to 6.0.

The water-soluble polydextrose is used in an amount, on an anhydrous or dry basis, of from about 5 to about 20 percent by weight, preferably from about 6 to about 18 percent by weight, based upon the weight of the reduced calorie cracker dough. If the water-soluble polydextrose is used in an amount of less than 5 percent, other bulking agents would be needed in undesirably large amounts to achieve a cracker having reduced calorie content. Use of the water-soluble polydextrose in amounts above 20 percent by weight may lead to flatulence, stool softening and even temporary diarrhea, depending on the total ingestion of the water-soluble polydextrose. Moreover, at weight percentages over about 20 percent by weight, it has been found that baking out of the crackers becomes difficult and raw flavor notes tend to occur. Also, at these high polydextrose contents, the dough becomes too soft and sticky to be rolled out properly during the sheeting process.

Water insoluble or dry or powdered polydextroses and/or polymaltoses may be included in the cracker doughs to replace flour and/or to enhance crispiness of the reduced calorie crackers. Suitable amounts for this purpose are less than about 8 percent by weight, preferably from about 1 to about 3 percent by weight, based upon the weight of the dough. At amounts above about 8 percent by weight, the crackers tend to become too hard or dense.

Water insoluble or dry or powdered polydextroses or polymaltoses which can be used in the present invention are disclosed in U.S. Pat. Nos. 3,766,165 and 3,876,794 to Rennhard. As disclosed in these patents, the linkage 1–6 predominates and the insoluble polydextroses have a number average molecular weight between about 6,000 and 36,000. They contain from about 2.5 to 10 mole percent of polycarboxylic acid ester cross-linkages wherein the acid is selected from the group consisting of citric, fumaric, tartaric, succinic, adipic, itaconic, and terephthalic acids.

A suitable commercially available polydextrose in dry or powdered form for use in the present invention is manufactured by Pfizer, Inc. The polydextrose powder is an amphorous, slightly acidic fusible powder. It has a calorific value of about 1.0 calories per gram. The typical specifications are the same for the powder as for polydextrose-N except the water content is less than 4 percent and the sulfated ash is less than 0.3 percent. Additionally, the pH (in 10 percent aqueous solution) is only 2.5 to 3.5, and the viscosity is only 34–36 cps for a 50 percent aqueous solution of the powder at 25° C.

Suitable cellulosic bulking materials for use in the doughs of the present invention are microcrystalline cellulosic materials (including acid modified microcrystalline celluloses) and carboxymethyl cellulose. Typically, these materials are produced by the acid hydrolysis of natural cellulose. Microcrystalline cellulose generally has a degree of polymerization of from about 125 to about 375, with less than 15 percent of the material having a degree of polymerization of less than 50 or more than 550. The particle size of microcrystalline cellulose materials typically ranges from about 1 micron to about 300 microns. The preparation of microcrystalline cellulose suitable for use in the present invention, and its properties are disclosed in U.S. Pat. No. 3,023,104. Commercially available forms of microcrystalline cellulose which can be used in the present invention include Avicel pH series 101 to 105, Avicel RC 591, and Avicel CL 611, manufactured by American Viscose Corporation, Philadelphia, Pa., a division of FMC Corporation, San Jose, Calif.

Another type of cellulosic bulking agent which can be used in the doughs of the present invention are alpha-celluloses. These materials are generally obtained from purified wood pulp in a known manner. It has been found that the alpha-celluloses tend to impart a slightly dry mouthfeel to the crackers. A suitable commercially available alpha-cellulose for use in the present invention is Solka-Floc (registered trademark) manufactured by James River Corporation, Hackensack, N.J.

The total amount of cellulose bulking agent should generally be from about 1.5 to about 10 percent by weight, preferably from about 2 to 10 percent by weight of the dough. Amounts of cellulosic bulking agents above about 10 percent by weight tend to result in crackers which are undesirably hard. Also, the dough becomes weak and tears apart easily during manufacturing operations.

An emulsifier or a blend of emulsifiers which has an HLB value of above 11 is preferred in the reduced calorie cracker doughs of the present invention because these emulsifiers are hydrophilic. They promote uniform distribution of the shortening into the water system of the dough. However, emulsifiers having lower HLB values can be used alone or in combination with emulsifiers having HLB values within the preferred range. As is known in the art, multi-component emulsifier systems generally provide greater emulsion stability than a single emulsifier and are accordingly preferred for use in the present invention.

Suitable emulsifiers include lactylic acid esters of fatty acids (LAEFA), ethoxylated monoglycerides (EMG) and diglycerides (EDG), polyglycerol esters (PGE) and diacetyl tartaric acid esters (DATA) and mixtures thereof. Exemplary of emulsifiers which can be used in the reduced calorie cracker doughs of the present invention are sorbitan monostearate, mono- and/or di-glycerides polyoxyethylene sorbitan fatty acid esters, such as polysorbate 60 (polyoxyethylene(20) sorbitan monostearate), and sodium stearoyl-2-lactylate (SSL).

The preferred emulsifier systems are: (1) a mixture of Softex ® and Emplex ® and (2) a mixture of Softex ® and Caprol PEG 860. Softex ® comprises a mixture of sorbitan monostearate and polysorbate 60, manufactured by William Tatz, Inc., New Jersey. Emplex ® is sodium stearoy-2-lactylate (SSL), a product of Patco Products, a division of C. J. Patterson Co., Kansas City, Mo. Caprol PEG 860 is a mixture of polyglycerol esters of fatty acids, manufactured by Capital City Products. The ratio of Softex ® to the SS1 or to the Caprol PEG 860 can suitably range from about 1:2 to about 2:1. The preferred ratio is about 1:1. An emulsifier system which has been found to result in acceptable textures in the crackers comprises a mixture of Softex ® and diacetyl tartaric acid esters of mono- and di-glycerides. The ratio of Softex ® to the diacetyl and tartaric acid esters is suitably from about 1:2 to about 2:1, preferably about 1:1.

The amount of the one or more emusifiers should be sufficient to achieve or enhance the primary functions of fats and shortenings which are replaced. Amounts from 0 to about 5 percent by weight, based upon the weight of the dough, can generally be used in the doughs of the present invention to achieve: (1) acceptable tenderization and freshness preservation of the crackers and, (2) acceptable lubrication and aeration of the doughs.

Some emulsifiers may serve as a complete replacement for the shortening or fat. Generally, these types of emulsifiers are partial glycerol esters, the major constituent of which is diglyceride. These types of emulsifiers are disclosed, for example, in U.S. Pat. No. 4,351,852. Exemplary of an emulsifier which can be used as a complete replacement for fat or shortening in the present invention is Dur-Lo (registered trademark). It is a mono- and di-glyceride emulsifier low in alpha-mono content and relatively high in di-glyceride content manufactured by SCM Durkee Industrial Foods Group.

The reduced calorie doughs of the present invention may contain shortening or fat without any emulsifier. The dough may also contain emulsifier without any shortening or fat. However, the reduced calorie doughs of the present invention should have at least 3 percent by weight of: (1) shortening or fat and/or (2) emulsifier. The combined weight percentages of the emulsifier and the shortening or fat should not exceed about 10 percent by weight of the dough. At amounts of the emulsifier/shortening or fat system below about 3 percent by weight, the dough consistency tends to impede machineability and dense textures tend to occur in the crackers. Increasing the amount of the emulsifier/shortening system above about 10 percent by weight leads to difficulty in achieving a balanced reduced calorie cracker formulation. In addition, excessive amounts of emulsifiers can cause over-expansion of the dough during baking and eventual collapse of the baked dough.

In the present invention, it is preferred to use a mixture of shortening or fat and emulsifier. The shortening or fat enhances the flavor, mouthfeel, and texture of the cracker. The emulsifier helps to reduce the fat requirement in the cracker and to preserve the freshness of the cracker. The preferred amount of the emulsifier ranges from about 0.1 to about 2 percent by weight of the dough.

The flour is used in an amount of from about 25 to about 85 percent by weight, preferably from about 35 to about 75 percent by weight, based upon the total weight of the dough. As in prior art cracker doughs, the flour used in the cracker doughs should be relatively strong, typically with a protein content of at least about 8 percent and an acid viscosity reading of 55° to 60°M. In fact, the processes of the present invention seem to demand greater flour strength than typical prior art processes for producing crackers. Accordingly, although in some cases a sufficiently strong flour may be used alone, in most cases it is desirable to add gluten, such as vital wheat gluten, to the flour in order to increase its strength. Since the flour and gluten together form in effect a fortified flour, references herein to quantities of flour include the gluten (if any) added to the dough.

The amount of gluten used in the dough composition of the present invention may range from 0 to about 20 percent by weight of the dough. The quantity of gluten needed for optimum results in handling of the dough and texture of the finished cracker varies depending upon whether the cracker is being prepared by the one-stage or two-stage process of the present invention. In the one-stage process, amounts of gluten of from about 6 to about 9 percent by weight of the dough give good results. However, in the two-stage process, larger amounts of gluten, from about 10 to about 18 percent by weight of the dough, are preferred, since doughs containing smaller amounts of gluten display a tendency to break during sheeting and other handling operations used in the preparation of crackers. Wheat flour is preferred but other flours conventionally used in the preparation of crackers can also be utilized in the present invention. At amounts below about 25 percent by weight flour, the amounts of other bulking agents, such as polydextrose or cellulosic bulking agents needed to replace the flour may result in products having a poor mouthfeel or which have an increased risk of causing diarrhea.

Suitable fats and shortening are those conventionally used in the production of crackers and include: (a) animal fats such as lard, and tallow, (b) hydrogenated animal fats, (c) hydrogenated or unhydrogenated vegetable oils, such as corn oil, peanut oil, coconut oil, palm kernel oil, palm oil, rapeseed oil, sunflower oil, safflower oil, and soybean oil. Mixtures of these fats and oils or shortenings can also be used. They may be emulsified or stabilized with mono-glycerides and di-glycerides, or other known emulsifiers. Commercially available emulsified or stabilized shortenings typically contain from about 2.25 to about 2.75 percent emulsifier by weight. The shortenings or fats can normally be solid at room temperature or above or liquid vegetable oils can be used. Fats or shortenings which melt or become pourable at temperatures of about 85° F. (29.4° C.) to about 110° F. (43.3° C.), for example, are suitable for use in the dough composition of the present invention. The shortening or fat is used in an amount of from 0 to about 10 percent by weight, preferably from about 2 to about 7 percent by weight, based upon the total weight of the dough.

The dough composition of the present invention contain as a leavening system, yeast and a material capable of releasing carbon dioxide during braking. The yeast serves its normal function of providing the natural aeration required to produce a conventional cracker, whereas the gas-releasing material provides additional fermenation during the braking of the cracker. The preferred amount of yeast varies depending upon whether the one-stage or the two-stage process of the invention is being employed. The one-stage process of the invention is intended primarily for use in a rapid-fermentaion system using fermentation times of (typically) 2 to 8 hours. Consequently, in this one-step process, relatively large amounts of yeast, from about 0.20 to about 0.40 percent by weight of the dough are preferred to ensure the desired rapid fermenation. In contrast, the two-stage process of the invention is intended primarily for use in a slow-fermentation process using fermentation times of (typically) 12 to 30 hours. Accordingly, in the two-stage process, smaller amounts of yeast, from 0.01 to 0.40 percent by weight of the dough, are preferred to ensure an appropriate rate of fermentation.

The gas-releasing material may be any of the materials hitherto used for this purpose in crackers. Such gas-releasing materials normally comprise at least one edible bicarbonate and/or carbonate and an acidifier which reacts with the bicarbonate and/or bicarbonate to generate carbon dioxide during baking.

Exemplary of the bicarbonate and carbonate salts useful in the leavening system are alkali metal, calcium and ammonium carbonates and bicarbonates, such as are sodium bicarbonate, ammonium bicarbonate, potassium bicarbonate, potassium carbonate, and mixtures thereof.

Examplary of acidifiers which can be used are sodium acid pyrophosphate, diammonium hydrogen phosphate (anhydrous), coated monocalcium phosphate, dicalcium phosphate dihydrate, sodium aluminum phosphate, acidic, a mixture of sodium aluminum phosphate, acidic with aluminum sulfate anhydrous, a mixture of sodium aluminum phosphate, acidic with anhydrous, coated monocalcium phosphate, and mixtures thereof. Gas release rates of these leavening acids are reported in Reiman, H., in "Chemical Leavening Systems", *Baker's Digest*, pps. 37–40, (July/August 1983). The bicarbonate and/or carbonate salts and/or the acidifiers may be fat-encapsulated or shortening-encapsulated to delay leavening action so that leavening occurs predominantly in the oven rather than prior to baking.

The relative amounts of the at least one bicarbonate and/or carbonate salt and the at least one acidifier are generally such so as to provide sufficient generation of leavening gases and to result in an acceptable pH in the final baked product. Suitable weight ratios of the at least one bicarbonate and/or carbonate salt to the at least one acidifier range from about 1.5:1 to about 6:1, preferably from about 2:1 to about 4:1.

Preferred leavening systems for producing reduced calorie crackers comprise ammonium bicarbonate or sodium bicarbonate and at least one of calcium acid phosphate, sodium aluminum phosphate and sodium acid pyrophosphate. A particularly preferred leavening agent which can conveniently be used comprises from about 40 to about 60 percent by weight of ammonium bicarbonate, from about 20 to about 40 percent by weight of sodium bicarbonate, and from about 15 to about 30 percent by weight of calcium acid phosphate, these percentages being based upon the total weight of the mixture of the three salts.

The gas-releasing material will normally be present in the dough of the present invention in amounts substantially greater than those of the yeast. The total amount of the leavening system present in the dough may vary from about 0.5 to about 5 percent by weight of the dough. Too low an amount of leavening system tends to produce crackers which are too hard and dense, while too high an amount of leavening system tends to produce crackers which are too fragile and friable. In general, use of from about 1 to about 4 percent by weight of leavening system in the dough yields crackers having a desirable crisp texture.

The texture and taste of the reduced calorie crackers of the present invention is affected by the pH of the baked cracker. At too high a pH, the crackers tend to be too alkaline testing, while too low a pH adversely affects the taste and texture of the cracker. To ensure satisfactory taste and texture, it is preferred that the reduced calorie cracker have a pH (measured by grinding the baked cracker and suspending the resultant particles in water to form a 10 percent by weight slurry) in the range of 7.0 to 8.0. To achieve a desired pH in the final cracker, an edible alkaline agent or material can be incorporated into the doughs of the present invention. Suitable edible alkaline agents for use in the present invention include bicarbonates, carbonates and/or hydroxides of sodium, ammonium and potassium. Since these bicarbonates may already be present in the dough as part of the leavening system, easy adjustment of pH can be made by varying the amount of bicarbonate included in the leavening system, although care must of course be taken to ensure that the leavening system still provides adequate leavening during baking.

Measurements of the pH of final baked cracker and the making of adjustments in the amount of edible alkaline agent in the dough to obtain a desired pH are within the ability of those ordinarily skilled in the art of making crackers. The pH measuring procedure already described, involving grinding of the baked cracker and the formation of a slurry from the resultant particles, provides a fast, accurate method suitable for monitoring production runs and making adjustments in the amount of alkaline agent in the dough based upon the pH of the slurry. However, it does have the disadvantage of requiring a sample of the baked cracker in order to make the pH determination, so that if the pH of a batch of dough is to be adjusted before baking, it is necessary to bake a sample of the batch, while holding the remainder of the batch unbaked until the pH determination and pH adjustment can be made. This delay in handling a dough batch can be avoided, as those skilled in the art are aware, by making pH measurements on the unbaked dough; for a dough of relatively constant composition, pH measurements of the unbaked dough can be correlated empirically with the pH expected in the baked cracker. pH measurements on unbaked dough can be made with temperature compensated electrodes placed directly in the dough, in a manner known to those skilled in the art.

It is of course necessary to add water to the dried ingredients of the doughs of the present invention in order to produce a workable dough. In general, the water will comprise from about 10 to about 30 percent by weight of the unbaked dough. Generally the addition of water, in amounts of about 15 to about 25 percent by weight of the unbaked dough provides a final moisture content which gives proper dough machineability to facilitate processes conventionally used to form crackers.

In addition to the ingredients already discussed, the doughs of the present invention may contain additional optional ingredients. An alkali metal bisulfite, for example sodium bisulfite, may be added to make the texture of the baked crackers more tender. The preferred amounts of alkali metal bisulfite for providing a suitably tender texture in the baked crackers are from about 0.05 to about 0.4 percent by weight of the dough composition.

The doughs of the present invention may also contain malt as a flavoring agent and as a source of amylolytic enzymes. Preferred amounts of malt range from about 0.1 to about 5 percent by weight of the dough. The dough compositions may also contain salt for flavoring purposes; the amount of salt present in the dough may typically range from about 0.5 to about 2 percent by weight of the dough.

As already mentioned, the present invention provides both a one-stage and two-stage process for producing crackers. In the one-stage process, all of the ingredients are mixed together to form a dough, this dough is allowed to ferment, and the fermented dough is then baked. In contrast, in the two-stage process, at least part of the flour, at least part of the gluten (if present) the water-soluble polydextrose and the yeast are mixed to form a sponge, this sponge is fermented, and the fermented sponge is then mixed with the remaining ingredients of the dough in a dough-up stage, which forms the finished dough. This finished dough is then baked to form the cracker. Also as already indicated, the one-stage process of the invention is primarily intended for use with relatively short fermentation times, typically from 2 to 8 hours, while the two-stage process will typically use longer fermentation times of from 12 to 30 hours. To ensure more rapid fermentation in one-stage process, a relatively large amount of yeast should be used, while in the two-stage process a smaller amount of yeast suffices. In both the one-stage and the two-stage processes, as in prior art processes for producing crackers, it is desirable to introduce into the dough or sponge, prior to fermentation, a bacterial starter or inoculum from a previous batch of dough or sponge to serve as a source of yeast and bacteria. The preparation of such bacterial starters or inocula is well-known and within the capability of those skilled in the art of cracker manufacture.

In the production of the sponge or fermentable dough, a buffering system may be used to compensate for water supplies which have very high pH's. Commercially available buffering system for this purpose or commercially available yeast foods which contain buffering systems can be used.

The water-soluble polydextrose used in the processes of the present invention is preferably added as an aqueous solution. Polydextrose in dry or powdered form displays a tendency to cause the formation of lumps if it is added to a moist mixture of ingredients. Such lumps are difficult to remove during the mixing of the dough and are highly undesirable in the finished crackers since lumps of polydextrose are unpalatable. Accordingly, in the processes of the invention, if dry or powdered form polydextrose must be used it is preferred that the polydextrose be mixed with other dry ingredients before water is added to the sponge or dough. For this reason, the polydextrose is mixed in with the flour during the sponge-forming step of the two-stage process of the invention, since attempted addition of polydextrose during the dough-forming stage would result in lump formation.

A preferred technique for forming the sponge in the two-stage process of the invention comprises mixing the sponge flour, sponge gluten (if any), the liquid polydextrose and malt (if any) to form a mixture, before adding the other components of the sponge. Similarly, in the one-stage process of the invention the flour, gluten (if any) and polydextrose should first be mixed together dry before any water is added to the mixture.

In the two-stage process of the invention, to ensure the proper tenderizing action the alkali metal bisulfite tenderizing agent, if used, should be incorporated into the sponge. To ensure even distribution of the relatively small amount of bisulfite tenderizing agent used, the bisulfite is preferably added to the sponge in the form of an aqueous solution.

In the two-stage process of the invention, it has been found that if the cellulosic bulking agent is added to the sponge, the bulking agent tends to absorb water from the sponge and consequently hinders fermentation. Accordingly, in the two-stage process it is preferred that the cellulosic bulking agent be added during the dough-up stage.

In both the one-stage and two-stage processes of the invention, when the final dough is formed, it is desirably proofed or allowed to stand, as is conventional in the cracker art in order to improve the texture of the finished crackers. The proofing time is desirably at least 2 hours, and good results have been obtained with the proofing time of 4 hours.

The proofed dough may then be machined and baked in the conventional manner for the production of crackers or other sponge goods. Soda and other crackers, for example, are formed from a continuous sheet of dough which is laminated or lapped before being cut. It has been found that, in the one-stage process of the invention, if the dough contains the preferred relatively low gluten content of about 6 to about 9 percent by weight, the resultant dough is very susceptible to overworking and the use of multi-stage lamination techniques will produce a product which is too compact. Accordingly, in the one-stage process of the invention it is preferred that only a single lamination of the dough be effected.

In the production of soda or other crackers, the dough pieces are formed by a stamping device such as a reciprocating cutter or rotary cutter, which does not entirely sever the individual cracker from the sheet. The crackers remain in a substantially continuous sheet through the oven, which is commercial production is normally a band oven. The cutter also punctures the dough pieces to form docking holes for the prevention of uneven or excess expansion in the oven. After baking, the individual crackers are separated from the substantially continuous sheet. Topping salt is normally applied after stamping and before baking.

The thickness and density of crackers are normally measured by determining the number of 2 inch (51 mm.) square crackers per pound. Traditionally, premium crackers have been made at about 160 crackers per pound. However, when preparing crackers by the one-stage process of the present invention, it has been found that it is desirable to make the crackers somewhat thicker, typically at about 125–130 crackers per pound, since such thicker crackers have a more tender texture. When preparing crackers by the two-stage process of the invention, it is also been found advantageous to make the crackers somewhat thicker than the normal premium crackers, typically at about 125 to 130 crackers per pound. Also, in the two-stage process, it has been found that a softer, more tender cracker is produced if a relatively large proportion of water, typically more than about 18 percent by weight of the dough, is included in the dough. It is believed that the reason such a high proportion of water is needed to produce a tender cracker is that the cellulosic bulking agent tends to absorb considerable quantities of water from the dough, thereby reducing the effective water content of the dough intending to make the product hard. Consequently, it is necessary to increase the water content of the dough to give an effective water content sufficient to produce a cracker having a sufficiently soft texture.

In both the one-stage and two-stage processes of the present invention, baking will typically be performed in a band oven having a perforated or mesh band. Baking temperatures and times are those conventionally used in the art of cracker making. In the case of soda crackers, baking temperatures in a band oven range from about 250° F. (121° C.) to about 750° F. (399° C.) for a period of about 1.5 to about 2.5 minutes are suitable.

The baked cracker is typically dried during the heating step or in a subsequent drying step to a moisture content of about 2 to about 4 percent by weight, based upon the final weight of the cracker. Topping oils, such as coconut oil or partially hydrogenated vegetable oils, can be applied very lightly to the surface of the cracker by spraying after baking as is conventional in the art.

The one-stage and two-stage processes of the present invention can be used for the production of any of various forms of crackers known in the art. For example, the processes may be produced to prepare soda crackers, oyster (soup) crackers, club crackers, spray crackers, cheese crackers and the like.

The crackers produced by the processes of the present invention tend to be somewhat darker in color than typical prior art crackers, but the difference in color is not sufficient to affect consumer acceptance of the crackers.

The following Examples are now given, though by way of illustration only, to show details of particularly preferred ingredients and techniques used in the doughs and processes of the present invention. All percentages, parts and proportions are by weight unless otherwise indicated.

EXAMPLE 1

This Example illustrates the production of soda crackers by a one-stage process of the present invention.

A rapid-fermentation dough was prepared from the following ingredients:

| Ingredients | Parts by Weight | % by Weight of Dough |
|---|---|---|
| Bread flour | 58.93 | 49.72 |
| Vital wheat gluten | 9.19 | 7.75 |
| Dextrose | 1.11 | 0.94 |
| Microcrystalline cellulose | 3.77 | 3.18 |
| Lard | 3.52 | 2.97 |
| Butter flavor | 1.25 | 1.05 |
| Polydextrose-N | 11.03 | 9.31 |
| Malt | 1.66 | 1.40 |
| Softex (emulsifier) | 0.275 | 0.23 |
| EMPLEX (emulsifier) | 0.275 | 0.23 |
| Salt | 1.11 | 0.94 |
| Sodium bicarbonate | 0.775 | 0.65 |
| Ammonium bicarbonate | 1.49 | 1.26 |
| Yeast | 0.33 | 0.28 |
| Bacterial culture | 0.022 | 0.02 |
| Calcium acid phosphate | 0.644 | 0.54 |
| Sodium bisulfite | 0.163 | 0.14 |
| Water | 22.98 | 19.39 |
| TOTAL | 118.524 | 100.00 |

To prepare this dough, the flour, gluten, butter flavor, dextrose and cellulose were placed in a spindle mixer trough of the type normally used for mixing and fermenting cracker doughs. These dry ingredients were then mixed gently by hand. The salt, sodium bicarbonate, ammonium bicarbonate and calcium phosphate were then sifted into the mixture in the trough and the polydextrose was added to the trough. The bacterial culture and yeast were then mixed into a portion of the water at 80° F. (26.7° C.) and added to the mixture in the trough. The sodium bisulfite was dissolved in the remaining water and also added to the trough. The ingredients in the trough were then mixed with the spindle mixer to 60 revolutions. The trough was then scraped. The lard was heated to 140° F. (60° C.), the emulsifiers mixed in with the melted lard to make a homogeneous blend, and the hot blend added to the ingredients in the trough. The resulting mixture was further mixed to 40 revolutions, the trough scraped and the mixture again mixed to 60 revolutions.

The resulting dough was covered with a plastic film and left to stand in a proof room for 4 hours at a dough temperature of 88°-94° F. (31.1°-34.4° C.).

The proofed dough was then rolled into a sheet 1-2 inches (25-51 mm.) thick, laminated in a single-step lamination process, rerolled to a sheet approximately 7/32 inch (5.6 mm.) thick and dough pieces 2 inches by 7/32 inch (51 by 5.6 mm.) formed by a stamping device which did not entirely sever the individual crackers from the sheet. The sheet was baked at a temperature of 550° F. (228° C.) for 2 minutes. The crackers were sprayed lightly with a lightly hydrogenated 50:50 w/w soybean/palm oil mixture at 140° F. (60° C.). The individual crackers where then separated from the sheet and weighed.

The resultant crackers had a weight of 125-130 counts per lb. They were golden brown in color with slightly more intense golden brown spots. The interior of the crackers showed a uniform structure with even air cells. The taste of the crackers was light and buttery.

EXAMPLE 2

This Example illustrates the preparation of soda crackers by a two-stage process of the invention.

A sponge was formulated from the following ingredients:

| Ingredients | Parts by Weight | % by Weight of Dough |
|---|---|---|
| Bread flour | 41.69 | 33.86 |
| Vital wheat gluten | 3.75 | 3.05 |
| Malt | 0.55 | 0.45 |
| Buffer | 0.50 | 0.41 |
| Bacterial culture | 0.0024 | 0.0020 |
| Yeast | 0.075 | 0.06 |
| Polydextrose-N | 11.00 | 8.93 |
| Water | 24.00 | 19.49 |
| Sodium bisulfite | 0.188 | 0.15 |

(The percentages in the list above are percentages by weight of the total weight of the final dough ingredients, not merely the ingredients used to form the sponge.)

To prepare the sponge, the flour, gluten and malt were placed in a spindle mixer trough and mixed gently by hand. The polydextrose, buffer, bacterial culture and yeast were mixed with a portion of the water and added to the ingredients in the trough. The sodium bisulfite was then dissolved in the remaining water at 60° F. (15.6° C.) and added to the mixture in the trough. The resultant mixture was mixed to 40 revolutions, the trough scraped and the mixing repeated to 60 revolutions and then finally to 80 revolutions. The resultant sponge was covered with a plastic film and allowed to stand in a sponge proof room for 19 hours.

The dough-forming ingredients added to the sponge in the dough-up stage were as follows:

| Ingredients | Parts by Weight | % by Weight of Dough |
|---|---|---|
| Butter flavor | 1.25 | 1.02 |
| Bread flour | 12.00 | 9.75 |
| Vital wheat gluten | 14.00 | 11.37 |
| Microcrystalline cellulose | 4.00 | 3.25 |
| Salt | 1.44 | 1.17 |
| Sodium bicarbonate | 0.875 | 0.71 |
| Ammonium bicarbonate | 1.33 | 1.08 |
| Calcium acid phosphate | 0.419 | 0.34 |
| Lard | 5.50 | 4.47 |
| Softex | 0.275 | 0.22 |
| DATA | 0.275 | 0.22 |
| | 123.119 | 100.00 |

(Again, percentages are by weight of the total dough, not merely of the dough-up stage ingredients.)

In the dough-up stage, the additional flour, gluten, alpha-cellulose and butter flavor were added to the fermented dough. The salt, sodium bicarbonate, ammonium bicarbonate and calcium acid phosphate were then sifted into the mixing trough and the resulting mixture mixed to 40 revolutions. The lard was heated to 140° F. (60° C.) and the two emulsifiers dissolved in the hot lard. The resultant mixture was added to the trough and mixed to 60 revolutions to produce the finished dough.

The dough was then covered with a plastic film and allowed to stand in a proof room for four hours, before being rolled and baked into crackers in the same manner as in Example 1 above.

The count per pound and other properties of the resultant cookies were substantially the same as those produced in Example 1 above.

It will be apparent to those skilled in the art that numerous changes and modifications can be made in the preferred embodiments of the invention described above without departing from the scope of the invention. Accordingly, the whole of the foregoing description is to be construed in an illustrative and not in a limitative sense, the scope of the invention being defined solely by the attended claims.

We claim:

1. A dough composition for producing reduced calorie crackers, the composition comprising:
   (a) from about 25 to about 85 percent by weight of flour;
   (b) from 0 to about 10 percent by weight fat or shortening;
   (c) from about 5 to about 20 percent by weight of a water-soluble polydextrose;
   (d) from 0 to about 5 percent by weight of at least one emulsifier;
   (e) from about 0.5 to about 5 percent by weight of a leavening system, the leavening system comprising yeast and a material which releases carbon dioxide during baking; and
   (f) from about 1.5 to about 10 percent by weight of a cellulosic bulking agent,
   said percentages being based upon the total weight of the dough, the total amount of the fat, shortening and emulsifier being from about 3 to about 10 percent by weight of the dough.

2. A dough composition according to claim 1 wherein the flour comprises from about 35 to about 75 percent by weight of the dough.

3. A dough composition according to claim 1 wherein the flour content comprises gluten in an amount not exceeding about 20 percent by weight of the dough.

4. A dough composition according to claim 3 for producing a rapid-fermentation dough, wherein the flour comprises gluten in an amount of from about 6 to about 9 percent by weight of the dough.

5. A dough composition according to claim 3 for producing a slow-fermentation dough, wherein the flour comprises gluten in an amount of from about 10 to about 18 percent by weight of the dough.

6. A dough composition according to claim 1 wherein the fat or shortening comprises from about 2 to about 7 percent by weight of the dough.

7. A dough composition according to claim 1 wherein the water-soluble polydextrose comprises from about 6 to about 18 percent by weight of the dough.

8. A dough composition according to claim 1 wherein the water-soluble polydextrose has a calorie content of not more than about 1 calorie per gram on a dry basis.

9. A dough composition according to claim 1 wherein the total weight of emulsifier is from about 0.1 to about 2 percent of the weight of the dough.

10. A dough composition according to claim 9 wherein the at least one emulsifier is selected from the group consisting of polyoxyethylene sorbitan fatty acid esters, sorbitan fatty acid esters, diacetyl tartaric acid esters and sodium stearoyl-2-lactylate.

11. A dough composition according to claim 10 wherein the at least one emulsifier comprises a mixture of polyoxyethylene(20)sorbitan monostearate, sorbitan monostearate and sodium stearoyl-2-lactylate or diacetyl tartaric acid esters of mono- and diglycerides.

12. A dough composition according to claim 1 wherein the leavening system comprises from about 1 to about 4 percent by weight of the dough.

13. A dough composition according to claim 1 wherein the leavening system comprises an alkali metal, calcium or ammonium carbonate or bicarbonate and an edible phosphate, the weight ratio of the carbonate or bicarbonate salt to the phosphate being in the range of from about 1.5:1 to about 6:1.

14. A dough composition according to claim 13 wherein the leavening system comprises sodium bicarbonate or ammonium bicarbonate and at least one of calcium acid phosphate, sodium aluminum phosphate and sodium acid pyrophosphate.

15. A dough composition according to claim 14 wherein the leavening system comprises 9 mixture of sodium bicarbonate, ammonium bicarbonate and calcium acid phosphate comprising from about 20 to about 40 percent by weight of sodium bicarbonate, from about 40 to about 60 percent of ammonium bicarbonate and from about 15 to about 30 percent of calcium acid phosphate.

16. A dough composition according to claim 1 comprising from about 0.01 to about 0.40 percent by weight of yeast.

17. A dough composition according to claim 1 wherein the cellulosic bulking agent comprises from about 2 to about 10 percent by weight of the dough composition.

18. A dough composition according to claim 1 wherein the cellulosic bulking agent is selected from the group consisting of alpha cellulose, microcrystalline cellulose, acid modified microcrystalline cellulose, carboxymethyl cellulose and mixtures thereof.

19. A dough composition according to claim 18 wherein the cellulosic bulking agent is microcrystalline cellulose.

20. A dough composition according to claim 1 further comprising an alkali metal bisulfite.

21. A dough compositon according to claim 20 wherein the alkali metal bisulfite comprises from about 0.05 to about 0.4 percent by weight of the dough composition.

22. A dough composition according to claim 1 further comprising from about 0.1 to about 5 percent by weight of malt.

23. A dough composition according to claim 1 comprising from about 35 to about 75 percent by weight of flour, from about 2 to about 10 percent by weight of shortening, from about 6 to about 18 percent by weight of the water-soluble polydextrose, from about 0.1 to about 2 percent by weight of the emulsifier and from about 2 to about 10 percent by weight of the cellulosic bulking agent.

24. A dough composition according to claim 1 having calorie content of from about 2.9 to about 3.3 calories per gram.

25. A process for producing a cracker, which process comprises mixing:
   (a) from about 25 to about 85 percent by weight of flour;
   (b) from 0 to about 10 percent by weight fat or shortening;
   (c) from about 5 to about 20 percent by weight of a water-soluble polydextrose;
   (d) from 0 to about 5 percent by weight of at least one emulsifier;

(e) from about 0.5 to about 5 percent by weight of a leavening system, the leavening system comprising yeast and a material capable of releasing gas during baking; and (f) from about 1.5 to about 10 percent by weight of a cellulosic bulking agent, to form a dough, said percentages being based upon the total weight of the dough, the total amounts of fat, shortening and emulsifier in the dough being from about 3 to about 10 percent by weight of the dough;

allowing said dough to ferment for at least about 2 hours; and baking the fermented dough to produce a cracker.

26. A process according to claim 25 wherein the flour comprises from about 35 to about 75 percent by weight of the dough.

27. A process according to claim 25 wherein the flour comprises gluten in an amount from about 6 to about 9 percent by weight of the dough.

28. A process according to claim 25 wherein the fat or shortening comprises from about 2 to about 7 percent by weight of the dough.

29. A process according to claim 25 wherein the water-soluble polydextrose comprises from about 6 to about 18 percent by weight of the dough.

30. A process according to claim 25 wherein the water-soluble polydextrose has a calorie content of not more than about 1 calorie per gram on a dry basis.

31. A process according to claim 25 wherein the total weight of emulsifier is from about 0.1 to about 2 percent of the weight of the dough.

32. A process according to claim 26 wherein the at least one emulsifier is selected from the group consisting of polyoxyethylene sorbitan fatty acid esters, sorbitan fatty acid esters, diacetyl tartaric acid esters and sodium stearoly-2-lactylate.

33. A process according to claim 33 wherein the at least one emulsifier comprises a mixture of polyoxyethylene(20)sorbitan monostearate, sorbitan monostearate and sodium stearoyl-2-lactylate or diacetyl tartaric acid esters of mono- and diglycerides.

34. A process according to claim 25 wherein the leavening system comprises from about 1 to about 4 percent by weight of the dough.

35. A process according to claim 25 wherein the leavening system comprises an alkali metal, calcium or ammonium carbonate or bicarbonaate and an edible phosphate, the weight ratio of the carbonate or bicarbonate salt to the phosphate being in the range of from about 1.5:1 to about 6.1.

36. A process according to claim 35 wherein the leavening system comprises sodium bicarbonate or ammonium bicarbonate and at least one of calcium acid phosphate, sodium aluminum phosphate and sodium acid pyrophosphate.

37. A process according to claim 36 wherein the leavening system comprises a mixture of sodium bicarbonate, ammonium bicarbonate and calcium acid phosphate comprising from about 20 to about 40 percent by weight of sodium bicarbonate, from about 40 to about 60 percent of ammonium bicarbonate and from about 15 to about 30 percent of calcium acid phosphate.

38. A process according to claim 25 wherein the yeast comprises from about 0.02 to about 0.40 percent by weight of the dough.

39. A process according to claim 25 wherein the cellulosic bulking agent comprises from about 2 to about 10 percent by weight of the dough composition.

40. A process according to claim 25 wherein the cellulosic bulking agent is selected from the group consisting of alpha cellulose, microcrystalline cellulose, acid modified microcrystalline cellulose, carboxymethyl cellulose and mixtures thereof.

41. A process according to claim 40 wherein the cellulosic bulking agent is microcrystalline cellulose.

42. A process according to claim 25 wherein an alkali metal bisulfite is added to the dough prior to the fermentation.

43. A process according to claim 42 wherein the alkali metal bisulphite comprises from about 0.05 to about 0.4 percent by weight of the dough.

44. A process according to claim 25 wherein from about 0.1 to about 5 percent by weight of malt, based upon the weight of the dough, is added to the dough prior to fermentation.

45. A process according to claim 25 wherein the dough comprises from about 10 to about 30 percent by weight of water.

46. A process according to claim 25 wherein the dough comprises from about 35 to about 75 percent by weight of flour, from about 2 to about 10 percent by weight of shortening, from about 6 to about 18 percent by weight of the water-soluble polydextrose, from about 0.1 to about 2 percent by weight of the emulsifier and from about 2 to about 10 percent by weight of the cellulosic bulking agent.

47. A process according to claim 25 wherein the fermentation is conducted for a period of from about 2 to about 12 hours.

48. A process according to claim 25 wherein the fat or shortening is added to the dough in liquid form.

49. A process according to claim 42 wherein the alkali metal bisulfite is added to the dough in the form of an aqueous solution.

50. A process according to claim 25 wherein, prior to baking, the dough is laminated using only a single laminating stage.

51. A process for preparing a cracker, the process comprising:

(A) mixing from about 20 to about 65 parts by weight of flour, from about 5 to about 20 parts by weight of a water-soluble polydextrose, and yeast to form a sponge;

(B) fermenting the sponge for a period of at least about 4 hours;

(C) mixing with said fermented sponge additional quantities of flour, a material which releases gas during baking and any other ingredients required to form a dough having the following composition:

(a) from about 25 to about 85 percent by weight of flour;

(b) from 0 to about 10 percent by weight fat or shortening;

(C) from about 5 to about 20 percent by weight of a water-soluble polydextrose;

(d) from 0 to about 5 percent by weight of at least one emulsifier;

(e) from about 0.5 to about 5 percent by weight of a leavening system, the leavening system comprising yeast and a material which releases gas during baking; and (f) from about 1.5 to about 10 percent by weight of a cellulosic bulking agent, said percentages being based upon the total weight of the dough, the total amount of fat, shortening and emulsifier being from about 3 to about 10 percent by weight of the dough; and (D) baking the dough to form a cracker.

52. A process according to claim 51 wherein about 27 to about 45 parts by weight of flour, from about 5 to about 12 parts by weight of water-soluble polydextrose and from 0.02 to about 0.2 parts by weight of yeast are used in step (A) to form the sponge.

53. A process according to claim 51 wherein the fermentation in step (B) is continued for a period of from about 16 to about 30 hours.

54. A process according to claim 51 wherein the dough formed in step (C) comprises from about 35 to about 75 percent by weight of flour.

55. A process according to claim 51 wherein the dough formed in step (C) comprises from about 10 to about 18 percent by weight of gluten.

56. A process according to claim 51 wherein the dough formed in step (C) comprises from about 2 to about 7 percent by weight of the fat or shortening.

57. A process according to claim 51 wherein the dough formed in step (C) comprises from about 6 to about 18 percent by weight of the water-soluble polydextrose.

58. A process according to claim 51 wherein the water-soluble polydextrose has a calorie content of not more than about 1 calorie per gram on a dry basis.

59. A process according to claim 51 wherein the dough formed in step (C) comprises from about 0.1 to about 2 percent by weight of the emulsifier.

60. A process according to claim 59 wherein the at least one emulsifier is selected from the group consisting of polyoxyethylene sorbitan fatty acid esters, sorbitan fatty acid esters and diacetyl tartaric acid esters, and sodium stearoyl-2-lactylate.

61. A process according to claim 60 wherein the at least one emulsifier comprises a mixture of polyoxyethylene(20)sorbitan monostearate, sorbitan monostearate and sodium stearoyl-2-lactylate or diacetyl tartaric acid esters of mono- and diglycerides.

62. A process according to claim 51 wherein the dough formed in step (C) comprises from about 1 to about 4 percent by weight of the leavening system.

63. A process according to claim 51 wherein, in the dough formed in step (C), the leavening system comprises an alkali metal, calcium or ammonium bicarbonate or carbonate and an edible phosphate, the weight of the carbonate or bicarbonate salt to the phosphate being in the range of from about 1.5:1 to about 6:1.

64. A process according to claim 63 wherein the leavening system comprises sodium bicarbonate or ammonium bicarbonate and at least one of calcium acid phosphate, sodium aluminum phosphate and sodium acid pyrophosphate.

65. A process according to claim 64 wherein the leavening system comprises a mixture of sodium bicarbonate, ammonium bicarbonate and calcium acid phosphate comprising from about 20 to about 40 percent by weight of sodium bicarbonate, from about 40 to about 60 percent of ammonium bicarbonate and from about 15 to about 30 percent of calcium acid phosphate.

66. A process according to claim 51 wherein the dough formed in step (C) comprises from about 0.01 to about 0.40 percent by weight of yeast.

67. A process according to claim 51 wherein the dough formed in step (C) comprises from about 2 to about 10 percent by weight of the cellulosic bulking agent.

68. A process according to claim 51 wherein the cellulosic bulking agent is selected from the group consisting of alpha cellulose, microcrystalline cellulose, acid modified microcrystalline cellulose, carboxymethyl cellulose and mixtures thereof.

69. A process according to claim 68 wherein the cellulosic bulking agent is microcrystalline cellulose.

70. A process according to claim 51 wherein the dough formed in step (C) further comprises an alkali metal bisulfite.

71. A process according to claim 70 wherein the alkali metal bisulphite comprises from about 0.05 to about 0.4 percent by weight of the dough.

72. A process according to claim 51 wherein the dough formed in step (C) further comprises from about 0.1 to about 5 percent by weight of malt.

73. A process according to claim 51 wherein the dough formed in step (C) further comprises from about 10 to about 30 percent by weight of water.

74. A process according to claim 51 wherein the dough formed in step (C) comprises from about 35 to about 75 percent by weight of flour, from about 2 to about 10 percent by weight of shortening, from about 6 to about 18 percent by weight of the water-soluble polydextrose, from about 0.1 to about 2 percent by weight of the emulsifier and from about 2 to about 10 percent by weight of the cellulosic bulking agent.

75. A process according to claim 51 wherein, after step (C), the dough is allowed to stand for at least about 2 hours before being baked in step (D).

76. A cracker prepared by baking a dough composition according to claim 1.

77. A cracker prepared by a process according to claim 25.

78. A cracker prepared by a process according to claim 51.

* * * * *